P. D. HIBNER.
VALVE.
APPLICATION FILED JAN. 18, 1919.
1,394,900.
Patented Oct. 25, 1921.
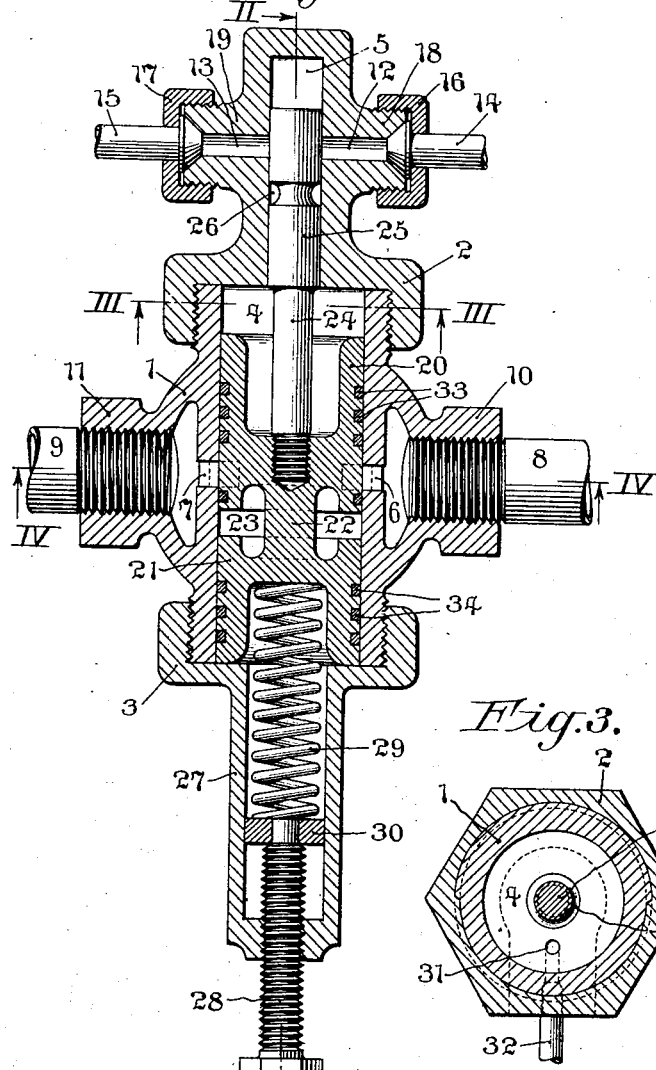
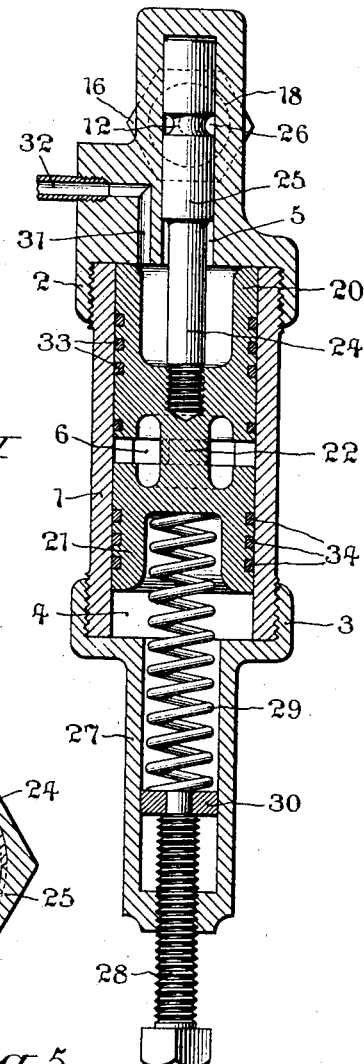
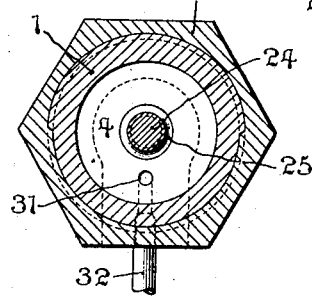
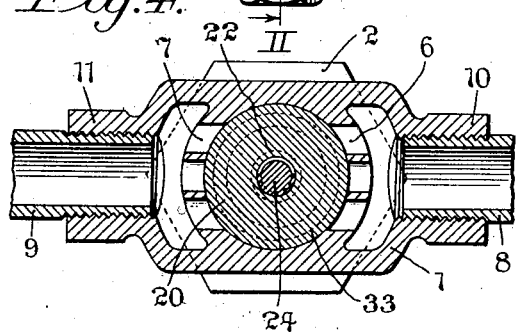
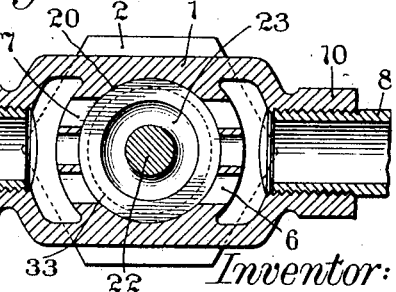
Inventor:
Philip D. Hibner
by attorneys

UNITED STATES PATENT OFFICE.

PHILIP D. HIBNER, OF SEATTLE, WASHINGTON.

VALVE.

1,394,900.  Specification of Letters Patent.  Patented Oct. 25, 1921.

Application filed January 18, 1919. Serial No. 271,857.

*To all whom it may concern:*

Be it known that I, PHILIP D. HIBNER, a citizen of the United States, and resident of the county of King, city of Seattle, and State of Washington, have invented a new and useful Improvement in Valves, of which the following is a specification.

The object of my invention broadly is to provide fluid pressure controlled means for opening and closing two fluid supply lines, such for instance, as an air supply line and a liquid supply line.

The object of my invention more specifically is to provide a valve for opening and closing both the compressed air supply line and the liquid fuel supply line of an internal combustion engine; said valve being controlled by variations in pressure in the gas fuel reservoir, whereby the gas pressure may be maintained at substantially a predetermined point.

My invention more particularly comprises a valve having two cylinders, one provided with the inlet and outlet ports of the compressed air line and the other with the inlet and outlet ports of the liquid fuel supply line; a common valve of the piston type having members working in said cylinders. This valve is moved in one direction to close the ports of both supply lines by a rise in the gas pressure exerted upon one end of one member of the valve, and moved in the other direction to open the ports in both supply lines by a fall in the gas pressure, said movement being obtained by spring pressure exerted upon the opposite end of said valve member; means being provided for adjusting the spring pressure to determine the point at which the gas pressure will operate the valve.

A practical embodiment of my invention is represented in the accompanying drawings, in which—

Figure 1 represents a longitudinal central section with the valve closed.

Fig. 2 represents a longitudinal central section in the plane of the line II—II of Fig. 1, with the valve open.

Fig. 3 represents a transverse section taken in the plane of the line III—III of Fig. 1.

Fig. 4 represents a transverse section taken in the plane of the line IV—IV of Fig. 1.

Fig. 5 represents a transverse section taken in the plane of the line IV—IV of Fig. 1 with the valve open.

The valve casing 1 is shown as provided with two removable heads 2 and 3, the casing having a large cylinder 4 and the head 2 having a small cylinder 5. The opposite side walls of the cylinder 4 have inlet and outlet ports 6 and 7 therethrough in open communication with their respective tubes 8 and 9 of the compressed air supply line. These tubes are shown as screwed into hollow bosses 10 and 11 of the valve casing in alinement with said inlet and outlet ports.

The opposite side walls of the cylinder 5 have inlet and outlet ports 12 and 13 therethrough in open communication with their respective tubes 14 and 15 of the liquid fuel supply line. Couplings 16 and 17 are shown as securing these tubes to hollow bosses 18 and 19 of the head 2.

The valve piston which works in the cylinders 4 and 5 for opening and closing the ports 6 and 7 of the compressed air supply line and 12 and 13 of the liquid fuel supply line comprises two members. One member has inner and outer ends 20 and 21 connected by a neck 22 to form a circumferential port 23.

The other member of the piston valve comprises a stem 24 screwed into the other member, said stem having a head 25 working in the cylinder 5. This head has a circumferential port 26.

The cylinder head 3 of the valve casing is shown as having a hollow axial extension 27 through the end of which passes an adjusting screw 28. An expansion spring 29 is located between the piston end 21 and a disk 30 on the inner end of the adjusting screw 28.

The space between the piston end 20 and the piston head 2 is at all times in open communication with a low pressure fuel gas reservoir (not shown herein) through a passage 31 and a tube 32.

If desired, the piston ends 20 and 21 may be provided with piston rings 33 and 34 to prevent leakage of the compressed air and to reduce the friction between the piston and the cylinder.

In operation, the spring 29 normally holds the piston valve in position to bring the port 23 opposite the ports 6 and 7, and the port 26 opposite the ports 12 and 13 thus opening the high pressure air line and the liquid fuel line. When the low fluid or gas pressure rises to a predetermined point it will move the piston valve against the pressure of the spring 29 sufficiently to close the inlet and outlet ports of both of the lines. This result may be accomplished at different low fluid or gas pressures by adjusting the tension of the spring 29 by turning the screw 28.

It will be seen that I have provided a very simple and effective valve in which the opening and closing of the compressed air line and liquid fuel line may be controlled by the low gas pressure, the arrangement of the ports being such that the low gas pressure does not have to work against high fluid pressure for the reason that the high pressure fluid as it passes through the piston port exerts its pressure equally toward both ends of the piston, thus permitting the piston to be moved in either direction easily by the overbalancing of the spring and low fluid pressures.

It is evident that various changes may be made in the construction, form and arrangement of the several parts without departing from the spirit and scope of my invention, and it is also evident that the valve may be used in connection with various fluids, hence I do not wish to limit myself to the particular construction and application herein set forth, but

What I claim is:

A valve comprising alined larger and smaller cylinders having their respective inlet and outlet ports, a piston valve having a member working in the larger cylinder and a member working in the smaller cylinder, spring means for moving the valve in one direction to open the ports, and a separate fluid pressure source for moving the valve in the other direction to close the ports, the valve being moved by the overbalancing of the two pressures.

In testimony, that I claim the foregoing as my invention, I have signed my name this 15th day of January 1919.

PHILIP D. HIBNER.